(12) United States Patent
Peterson (10) Patent No.: US 6,781,784 B2
(45) Date of Patent: Aug. 24, 2004

(54) READING TAPE WITH TRANSVERSE DISTORTION (75) Inventor: David L. Peterson, Boulder, CO (US)

(73) Assignee: Storage Technology Corporation, Louisville, CO (US)

(*) Notice: Subject to any disclaimer, the term of this patent is extended or adjusted under 35 U.S.C. 154(b) by 510 days.

(21) Appl. No.: 09/834,233

(22) Filed: Apr. 13, 2001

(65) Prior Publication Data

US 2002/0163752 A1 Nov. 7, 2002

(51) Int. Cl.$^7$ .................................................. G11B 5/00
(52) U.S. Cl. .......................... 360/76; 360/77.12; 360/63
(58) Field of Search ............................... 360/76, 77.12, 360/63, 78.05

(56) References Cited

U.S. PATENT DOCUMENTS

| | | |
|---|---|---|
| 3,761,903 A | 9/1973 | Bird, Jr. et al. |
| 3,869,721 A | 3/1975 | Korda |
| 5,050,018 A | 9/1991 | Georgis et al. |
| 5,124,851 A | 6/1992 | Masui et al. |
| 5,191,491 A | 3/1993 | Zweighaft |
| 5,323,276 A | 6/1994 | Ono |
| 5,353,176 A | 10/1994 | Kosuge |
| 5,452,153 A * | 9/1995 | Baheri et al. ............. 360/78.05 |
| 5,557,482 A | 9/1996 | Christensen et al. |
| 5,828,514 A | 10/1998 | Chliwnyj et al. |
| 5,946,159 A * | 8/1999 | Chliwnyj et al. ......... 360/77.12 |
| 5,969,898 A | 10/1999 | Hansen et al. |
| 6,038,092 A | 3/2000 | Wojciechowski et al. |
| 6,108,159 A | 8/2000 | Nute et al. |
| 6,141,174 A | 10/2000 | Judge et al. |
| 6,222,698 B1 * | 4/2001 | Barndt et al. ................... 360/76 |
| 6,243,225 B1 * | 6/2001 | Wyman et al. ........... 360/77.12 |

* cited by examiner

Primary Examiner—David Hudspeth
Assistant Examiner—K. Wong
(74) Attorney, Agent, or Firm—Brooks Kushman P.C.

(57) ABSTRACT

Magnetic tape experiencing transverse distortion may be read by selecting between longitudinally offset read elements to read a data track. The read elements are part of a tape head having an azimuth angle relative to the tape which creates a transverse offset between the data read elements. This transverse offset is exploited to minimize the effects of any transverse tape distortion.

24 Claims, 7 Drawing Sheets

READING TAPE WITH TRANSVERSE DISTORTION

BACKGROUND OF THE INVENTION

1. Field of the Invention

The present invention relates to reading data from tape.

2. Background Art

Data storage systems including tape moving relative to a tape head are commonly used to store information due to the reliability, low cost, efficiency, and ease of use of such tape systems. Information may be stored on tape through a variety of means such as magnetic, optical, and the like. Tape may be made more useful and cost-effective by increasing the volume density of stored information. This may be accomplished by including more data tracks across a given width of the tape. While allowing more data to be stored, the increase in density of data tracks requires a narrowing of the width of the data tracks, a narrowing of the spacing between data tracks, or both. As data tracks are more closely spaced, positioning of the tape with respect to a tape head becomes more critical to reduce the possibility of errors introduced while reading or writing information.

Density of stored information may also be increased by reducing the thickness of the tape. Reducing tape thickness, however, also increases the likelihood of tape distortion. Various factors including tension, temperature, humidity, time, and the like may cause the width of tape to shrink or expand, creating transverse distortion. Such shrinkage or creepage affects the spacing between data tracks.

Tape may also be made more useful and cost-effective by increasing the rate of data storage and retrieval. Typically, high data rate access is achieved by reading or writing multiple tracks simultaneously. This is accomplished with a tape head having multiple read and write elements spaced across the width of the tape. Thus, as the tape moves past the head, multiple tracks may be written or read simultaneously. However, since the head geometry is relatively fixed, shrinkage or creepage which changes the spacing between data tracks may result in an increase in read errors or, if extreme, the complete inability to simultaneously read multiple tracks.

What is needed is to reliably read data recorded on tape that has experienced transverse distortion such as shrinkage, creepage, and the like. This ability is particularly useful when data recorded in one format is read by a next generation tape system having smaller read elements.

SUMMARY OF THE INVENTION

The present invention permits reading magnetic tape having transverse distortion by selecting between longitudinally offset read elements to read the data track. The read elements are part of a tape head having an azimuth angle relative to the tape which creates a transverse offset between the data read elements. Thus, a particular read element is selected to minimize the effects of any transverse tape distortion.

A method for reading data recorded on a tape having transverse distortion is provided. The data is written on a data track. The data is read by a tape head having an azimuth angle relative to the tape. The azimuth angle creates a transverse offset between a data read element on a first module and a corresponding data read element on a second module. A measure of the transverse distortion is determined based on reading a plurality of servo tracks recorded on the tape. Either the first module read element or the second module read element is selected for reading the data track based on the determined transverse distortion.

In an embodiment of the present invention, determining a measure of the azimuth angle includes reading a servo track recorded on the tape with a first servo read element located on the first module. The servo track is also read with a second servo read element located on the second module. The measure of azimuth angle is determined based on signals produced by reading with the first and second servo read elements.

In another embodiment of the present invention, determining a measure of the transverse distortion includes reading a first servo track recorded on the tape with a first servo read element located on a module. A second servo track recorded on the tape is read with a second servo read element located on the same module. The measure of transverse distortion is determined based on signals produced by reading with the first servo read element and the second servo read element.

In still another embodiment of the present invention, determining a measure of the azimuth angle includes reading at least one servo track recorded on the tape with each of a plurality of pairs of servo read elements. The measure of the azimuth angle is determined based on averaging azimuth angles determined from each pair of servo read elements.

In yet another embodiment of the present invention, the azimuth angle is determined based on reading at least one servo track recorded on the tape. Selecting either the first module read element or the second module read element for reading the data track is based on the determined azimuth angle.

In a further embodiment of the present invention, the measure of transverse distortion for a length of tape is determined before data is read from the length of tape.

In a still further embodiment of the present invention, regions exhibiting poor data read signal quality are precharacterized. Such regions might be inferred by a low signal-to-noise ratio (SNR) or by the incidence of error correction code (ECC) array transient errors such as full error correction code uncorrectable errors.

In a still further embodiment of the present invention, the azimuth angle is adjusted to change the transverse offset between the first module read element and the second module read element.

A system for reading information recorded on tape having at least one servo track and at least one data track is also provided. The system includes a tape head having at least a first module and a second module. Each module has at least one read element for reading data written on the tape. The tape head has an azimuth angle relative to the tape, the azimuth angle creating a transverse offset between each read element on the first module and a corresponding read element on the second module. A plurality of servo read elements are also included. Each servo read element is located on one of the modules. Each servo read element generates a servo read signal based on reading a servo track recorded on the tape. Control logic determines tape position error based on the servo read signals. The control logic determines whether to read the data track with the first module read element or the second module corresponding read element based on the determined tape position error.

A method for reading data recorded as a plurality of data tracks on magnetic tape is also provided. The data is read by a tape head having at least a first module and a second module. The first module has a plurality of read elements.

The second module has a plurality of corresponding read elements. The tape head forms an azimuth angle with the tape. The azimuth angle creates a transverse offset between a data read element on the first module and a corresponding data read element on the second module. Each data read element on the first module is grouped into a first group and a second group. Each data read element on the second module is grouped into the first group if the data read element corresponds with a first module first group data read element. Each data read element on the second module is grouped into the second group if the data read element corresponds with a first module second group data read element. A measure of transverse distortion on the tape is determined. At least one data track is read with a first module first group data read element. At least one additional data track is read. The additional data track is read with either a data read element from the first module second group or a data read element from the second module second group based on the determined measure of transverse distortion.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
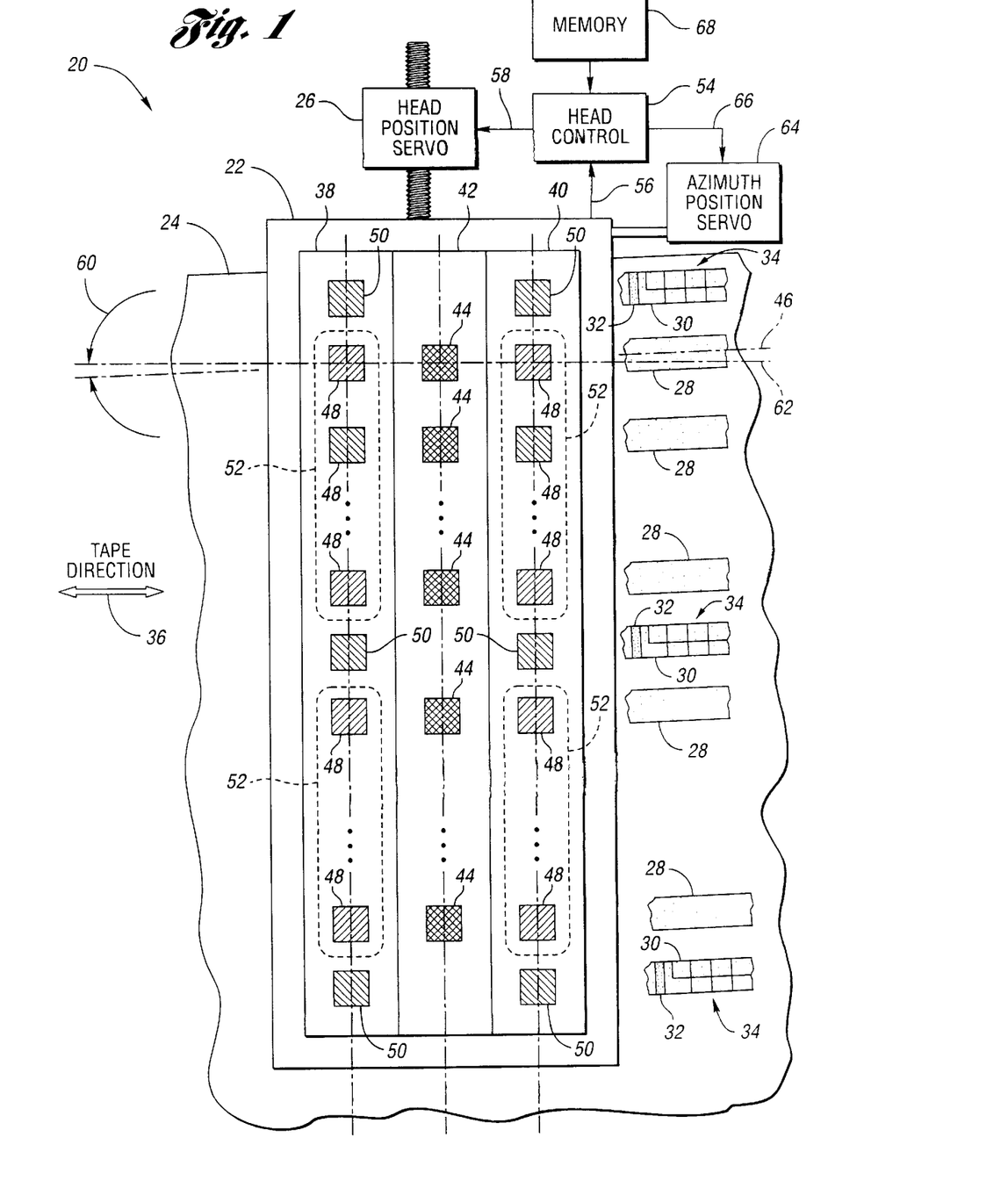
FIG. 1 is a block diagram illustrating a tape system according to an embodiment of the present invention.

Referring to FIG. 1, a block diagram illustrating a tape system according to an embodiment of the present invention is shown. A tape deck, shown generally by 20, includes tape access head assembly 22 for accessing magnetic tape 24. Tape access head assembly 22 is positioned longitudinally relative to tape 24 by head positioning servo 26.

Tape 24 includes a plurality of data tracks 28 spaced across the width of tape 24. Tape 24 also includes one or more servo tracks 30 written along the length of tape 24. Each servo track 30 may include periodically spaced features such as synchronization field 32 and servo tracking patterns, shown generally by 34. Tape 24 travels across tape access head assembly 22 in either tape direction 36. Only a portion of each data track 28 and servo track 30 are shown and only an outline for a portion of tape 24 is provided to permit the details of tape head 22 to be seen.

Tape access head assembly 22 includes first module 38 and second module 40 separated by write module 42 to form a read-write-read head. Write module 42 includes a plurality of data write elements 44. Alternatively, write elements 44 may be included in first module 38 and second module 40. Each write element 44 forms a magnetic circuit which induces field patterns on data track 28 lying along data track centerline 46 as tape 24 moves past a gap in write element 44. First module 38 and second module 40 is each manufactured to have a plurality of data read elements 48 and one or more servo read elements 50. Data read elements 48 and servo read elements 50 sense field patterns written onto data tracks 28 and servo tracks 30, respectively, by detecting changes in inductive or magnetoresistive voltage signals resulting from the field patterns. Each data read element 48 may be placed in one group 52 based on the location of data read element 48 on module 38,40.

Servo read element 50 is positioned to read servo tracking pattern 34 on servo track 30. Head control 54 receives servo read signals 56 from each servo read element 50 reading servo tracking pattern 34. Head control 54 determines the offset of tape 24 relative to tape access head assembly 22 in the direction normal to tape direction 36 based on servo read signals 56. Head control 54 generates module control signal 58 causing head position servo 26 to move tape access head assembly 22 relative to tape 24 until servo track 30 is positioned across servo read element 50. Ideally, this centers data track 28 across write element 44 and corresponding data read elements 48 aligned with data track centerline 46. However, tape head 22 may be at azimuth angle 60 relative to tape 24. Azimuth angle 60 may be defined by a variety of means. For example, azimuth angle 60 may be expressed as the angle between data track centerline 46 and centerline 62 through write element 44 and corresponding data read elements 48. Azimuth angle 60 may be fixed by the manufacture of tape system 20. Alternatively, azimuth angle 60 may be adjustable by azimuth position servo 64 based on azimuth signals 66 received from head control 54.

Head position servo 26 and azimuth position servo 64 provide means for positioning tape head 22 relative to tape 24. Head position servo 26 and azimuth position servo 64 may include an electric actuator, a hydraulic actuator, a pneumatic actuator, a magnetic actuator, or the like. Force may be transferred through a variety of transmission systems including gear trains, screws, levers, cabling, belts, and the like. In a preferred embodiment, a voice coil motor is used to implement head position servo 26. Azimuth position servo 64 is preferably implemented by piezoelectric drivers.

Tape 24 may suffer transverse distortion which changes the width of data tracks 28 as well as the spacing between data tracks 28. Tape system 20 determines a measure of the transverse distortion based on reading at least one servo track 30. Tape system 20 then selects either data read element 48 from first module 38 or data read element 48 from second module 40 for reading data track 28 based on the determined transverse distortion.

The transverse distortion for a length of tape 24 may be determined before data is read from the length of tape by accessing a length of tape 24 prior to the read attempt. This measure of transverse distortion may be saved in memory 68 and used by head control 54 to determine which data read element 48 to use in reading data track 28. Similarly, the quality of signals produced by read elements 48, such as may be caused by tenting of tape 24, noise, debris on tape 24, and the like, may be precharacterized and stored in memory 68. Parameters measuring signal quality include signal-to-noise ratio and rate of uncorrectable errors. Head control 54 may then decide which data read element 48 to use based on the precharacterized data read signal quality.

Tape head 22 illustrated in FIG. 1 has a read-write-read configuration to permit read-after-write operation in either tape direction 36. Typically, each module 38,40,42 is constructed using thin film techniques then the modules are glued together. As will be recognized by one of ordinary skill in the art, this is not the only arrangement to which the present invention applies. For example, tape head 22 may be configured with two modules, each module having data read element 48 and data write element 44 per each data track 28 simultaneously accessed. Further, the use of the term module does not prohibit all data read elements 48 from being constructed as a single unit, such as by successive thin or thick film processes. The use of first module 38 and second module 40 is merely a linguistic convenience to indicate longitudinal separation of data read elements 48 in the direction of tape direction 36. It will further be recognized that the selection of which module is the first module and which is the second module is completely arbitrary.

Figure 2:
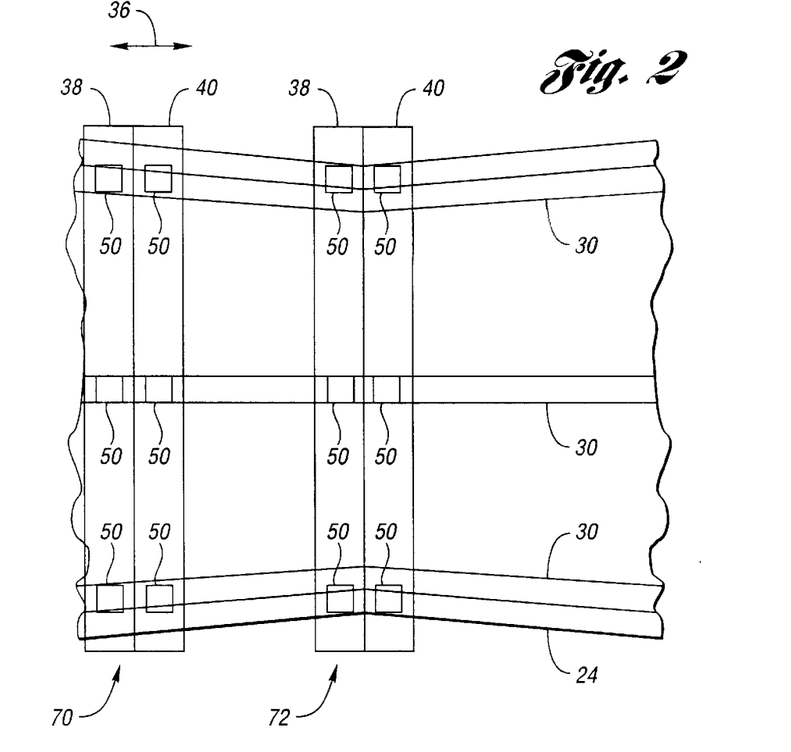
FIG. 2 is a schematic diagram illustrating servo track reading in the presence of longitudinal tape distortion according to an embodiment of the present invention.

Referring now to FIG. 2, a schematic diagram illustrating servo track reading in the presence of longitudinal tape distortion according to an embodiment of the present invention is shown. Tape 24 is depicted with a type of transverse distortion known as "bow-tie" distortion often associated with center-parked two-spool cassettes. This distortion is shown greatly exaggerated. Typically, a transverse distortion of ten microns over hundreds of meters of tape might occur. Tracks written on tape 24, such as servo tracks 30, suffer transverse distortion by an amount and in a particular direction based on the location of track 30 across the width of tape 24 at a given position along the length of tape 24.

FIG. 2 illustrates a two module tape head shown in a first position by reference 70 and in a second position by reference 72. The head includes first module 38 with three servo read elements 50 and second module 40 with three corresponding servo read elements 50. In first position 70, servo read elements 50 are approximately centered over servo tracks 30 when the head is appropriately positioned based on signals received from servo read elements 50. The effects of narrowing the distance between servo tracks 30 caused by transverse distortion in tape 24 can be seen with the head as indicated by position 72.

The amount of transverse distortion may be determined by reading one or more servo tracks 30 with servo read elements 50. For example, at least two servo tracks 30 may be read by servo read elements 50 on one module 38,40. Control logic 54 attempts to balance the sum of position error signals (PES) 56 to zero by moving head assembly 22 transversely across tape 24. Changes in PES 56 from one longitudinal position along tape 24 to another longitudinal position indicates transverse distortion in tape 24 between these two positions. For example, the difference in transverse distortion of the upper servo track 30 relative to the center servo track 30 can be expressed as ΔPES/S, where ΔPES is the change in PES of upper servo real element 50 and S is the separation between the upper and center servo read elements 50.

The amount of tape azimuth may be determined by several methods. One method employs at least one servo track 30 and corresponding servo read elements 50 accessing servo track 30. Typically, one servo read element 50 from each module 38,40 is used for each servo track 30 read. The difference in PES signals 56 between a pair of corresponding servo read elements 50 is used to determine the tilt or azimuth (θ) 60 between tape 24 and head 22 according to the following formula for small azimuth angles:

$$\theta \approx \frac{\Delta PES}{G}$$

where G is the gap-to-gap or longitudinal spacing between servo read elements 50.

In another embodiment, the amount of azimuth 60 is determined by observing timing signals, such as produced by reading fields 32,34 from servo track 30, generated by two servo read elements 50 reading different servo tracks 30 on the same module 38,40. The difference in timing reflects head azimuth 60 accounting for any azimuth occurring between the servo write head that wrote servo tracks 30 and tape 24.

The accuracy of either or both of transverse distortion measurement or azimuth measurement may be increased by averaging multiple readings. An average may be made with the results taken from multiple sets of servo read elements 50, from a single set of servo read elements 50 averaged over time or longitudinal position, or by any combination.

Figure 3:
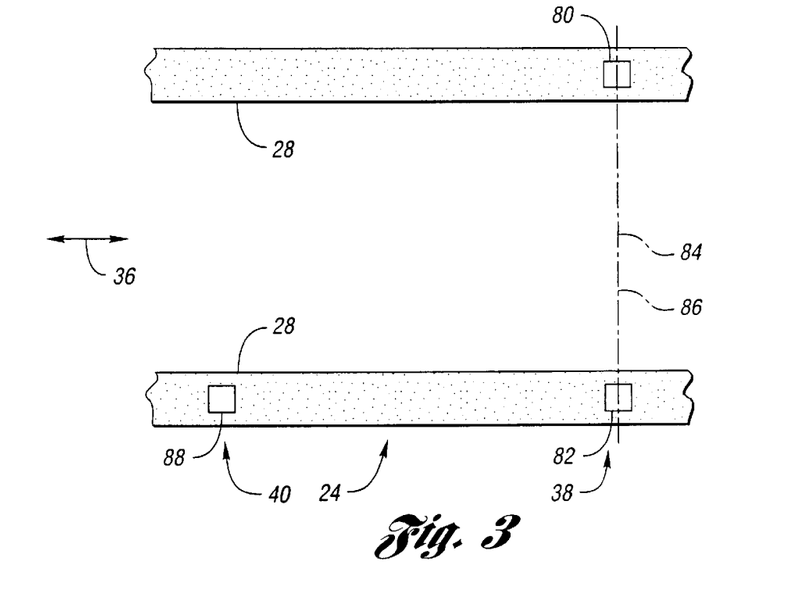
FIG. 3 is a schematic diagram illustrating reading data tracks on distortion-free tape.

Referring now to FIGS. 3–6, reading data from a data track in various configurations is illustrated. In these examples data read elements, indicated by 48 in FIG. 1, are depicted as having approximately half the width of data track 28. In FIG. 3, reading data tracks on distortion-free tape is shown. Tape 24 is illustrated with two data tracks 28. Data read element 80 and data read element 82, both located on first module 38, access each data track 28, respectively. Azimuth angle 60 is zero, as indicated by centerline 84, running through data read elements 80,82, coinciding with line 86 normal to data tracks 28. Data read element 88, located on second module 40, is not needed for the read operation.

Figure 4:
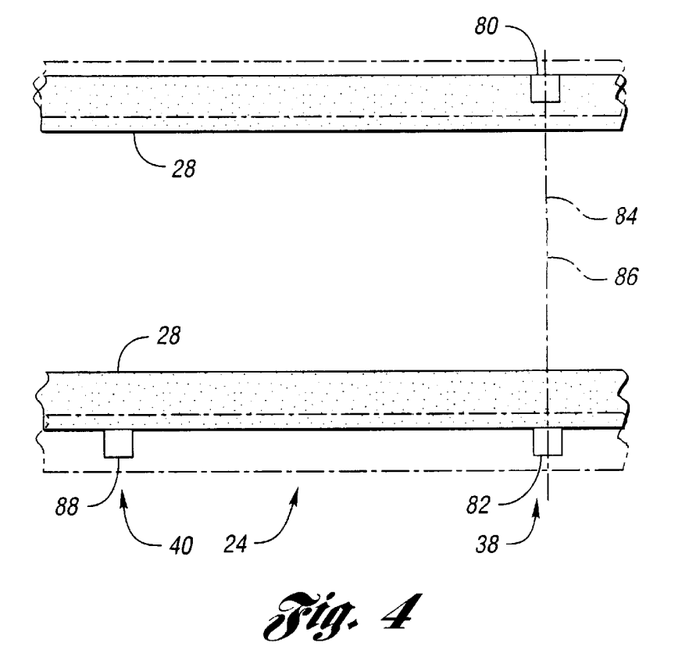
FIG. 4 is a schematic diagram illustrating read element misalignment due to longitudinal tape distortion.

Referring now to FIG. 4, a schematic diagram illustrating read element misalignment due to transverse tape distortion is shown. Tape 24 is shown with narrowing transverse distortion which shrinks the width of data tracks 28 and reduces the spacing between data tracks 28. In this example, the transverse distortion is severe enough such that, if read element 80 is positioned to fit within data track 28, read element 82 falls without its corresponding data track 28.

Figure 5:
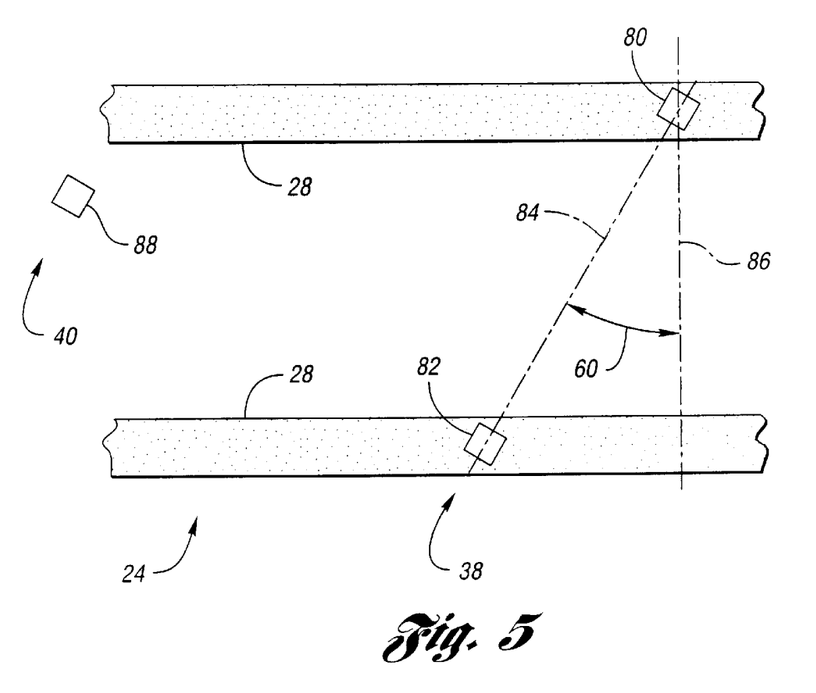
FIG. 5 is a schematic diagram illustrating azimuth angle rotation for same module reading of data tracks on a tape with longitudinal distortion.

Referring now to FIG. 5, a schematic diagram illustrating azimuth angle rotation for same module reading of data tracks on a tape with transverse distortion is shown. Data tracks 28 on tape 24 are suffering from the same transverse distortion illustrated in FIG. 4. In order to read both data tracks 28, azimuth angle 60 is increased to allow both data read element 80 and data read element 82 on module 38 to fall within their respective data tracks 28. One problem with this solution is the costly azimuth position servo system 64 required to implement such a large azimuth angle 60. Another problem created by large azimuth angle 60 results from distortion in reading data tracks 28 and servo tracks 30 by data read elements 48 and servo read elements 50, respectively, that are highly skewed relative to data tracks 28 and servo tracks 30.

Figure 6:
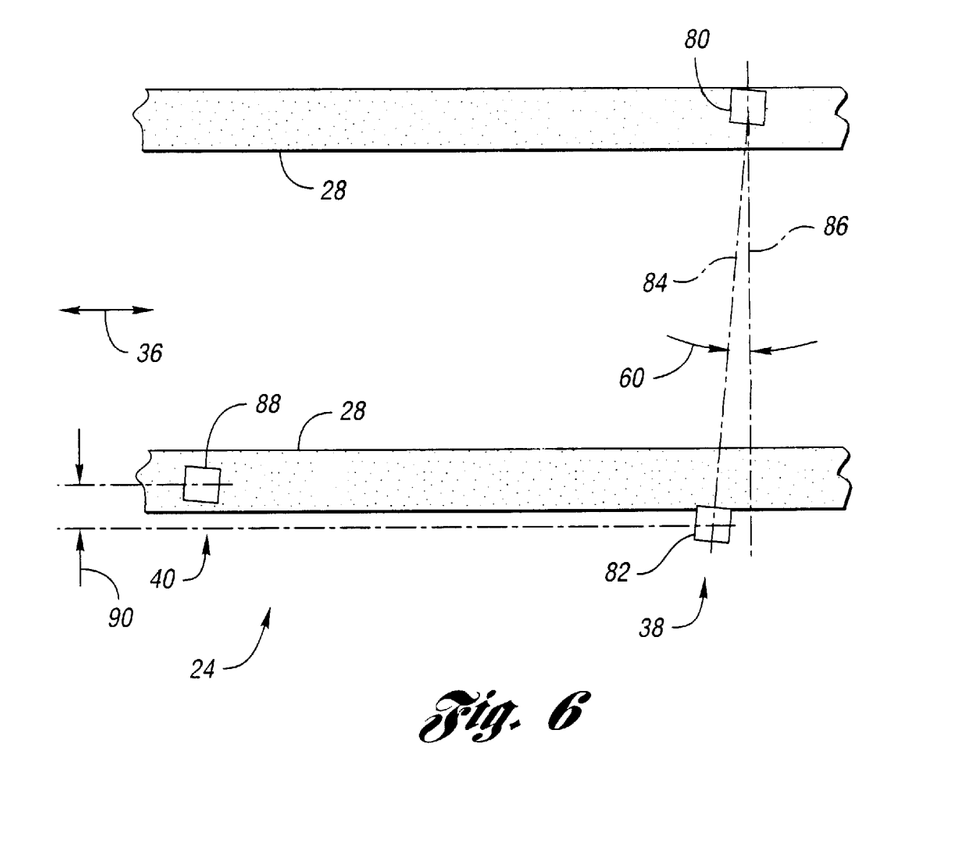
FIG. 6 is a schematic diagram illustrating azimuth angle rotation for different module reading of data tracks on a tape with longitudinal distortion according to an embodiment of the present invention.

Referring now to FIG. 6, a schematic diagram illustrating azimuth angle rotation for different module reading of data tracks on a tape with transverse distortion according to an embodiment of the present invention is shown. Azimuth angle 60 permitting both data tracks 28 to be read can be substantially reduced if data read element 88 on second module 40 is selected to read one of data tracks 28. Azimuth angle 60 creates a transverse offset, indicated by reference 90, between data read element 82 located on first module 38 and corresponding data read element 88 located on second module 40. This transverse offset 90 may be exploited to compensate for transverse distortion in block 24. If azimuth angle 60 is variable, transverse offset 90 may be increased or decreased by changing azimuth angle 60. Azimuth angle 60, in this case, may typically be in the range of arc-minutes.

Figure 7:
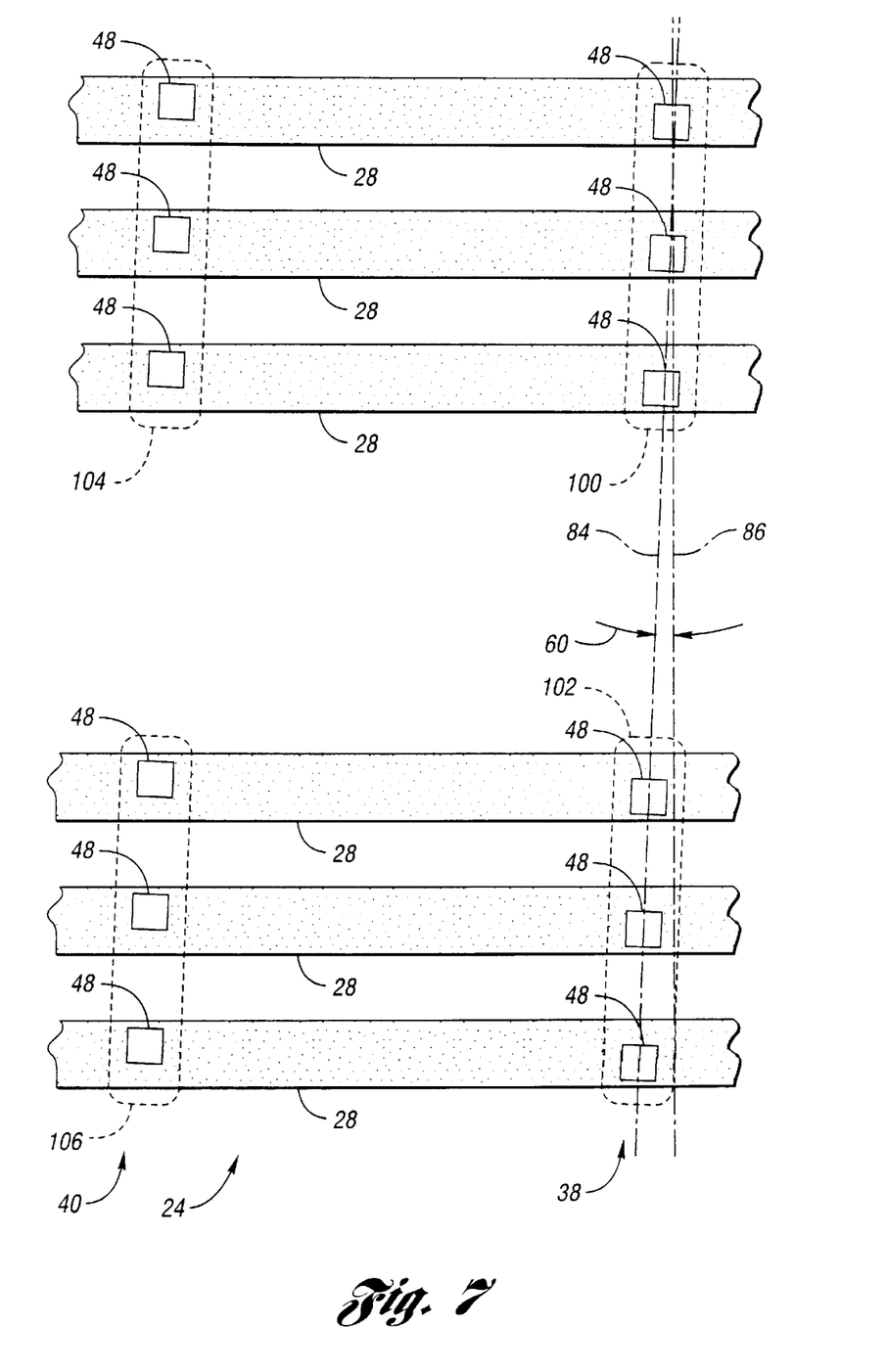
FIG. 7 is a schematic diagram of read element grouping for reading a tape with no longitudinal distortion according to an embodiment of the present invention.
Figure 8:
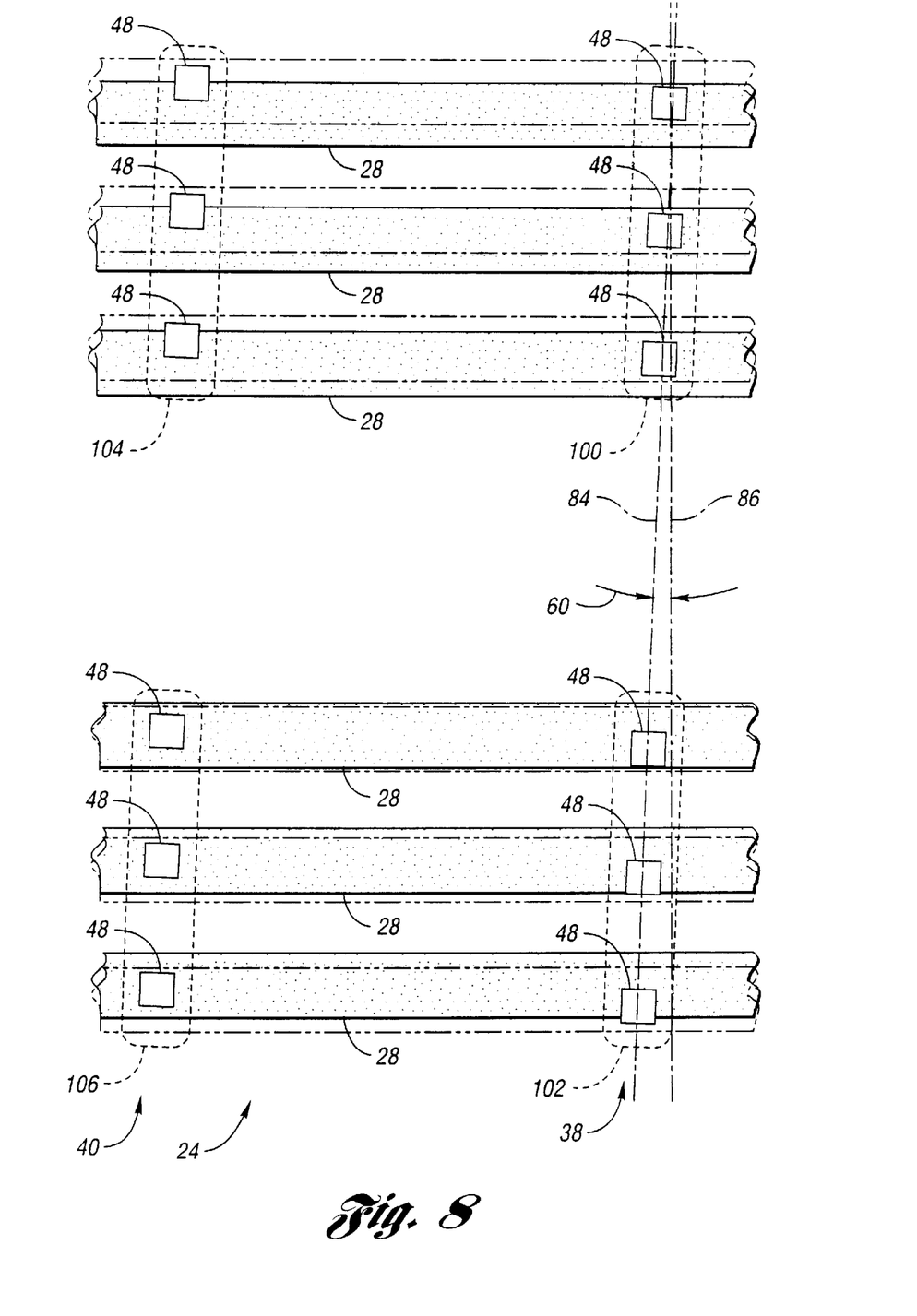
FIG. 8 is a schematic diagram of read element grouping for reading a tape with compressive longitudinal distortion according to an embodiment of the present invention.
Figure 9:
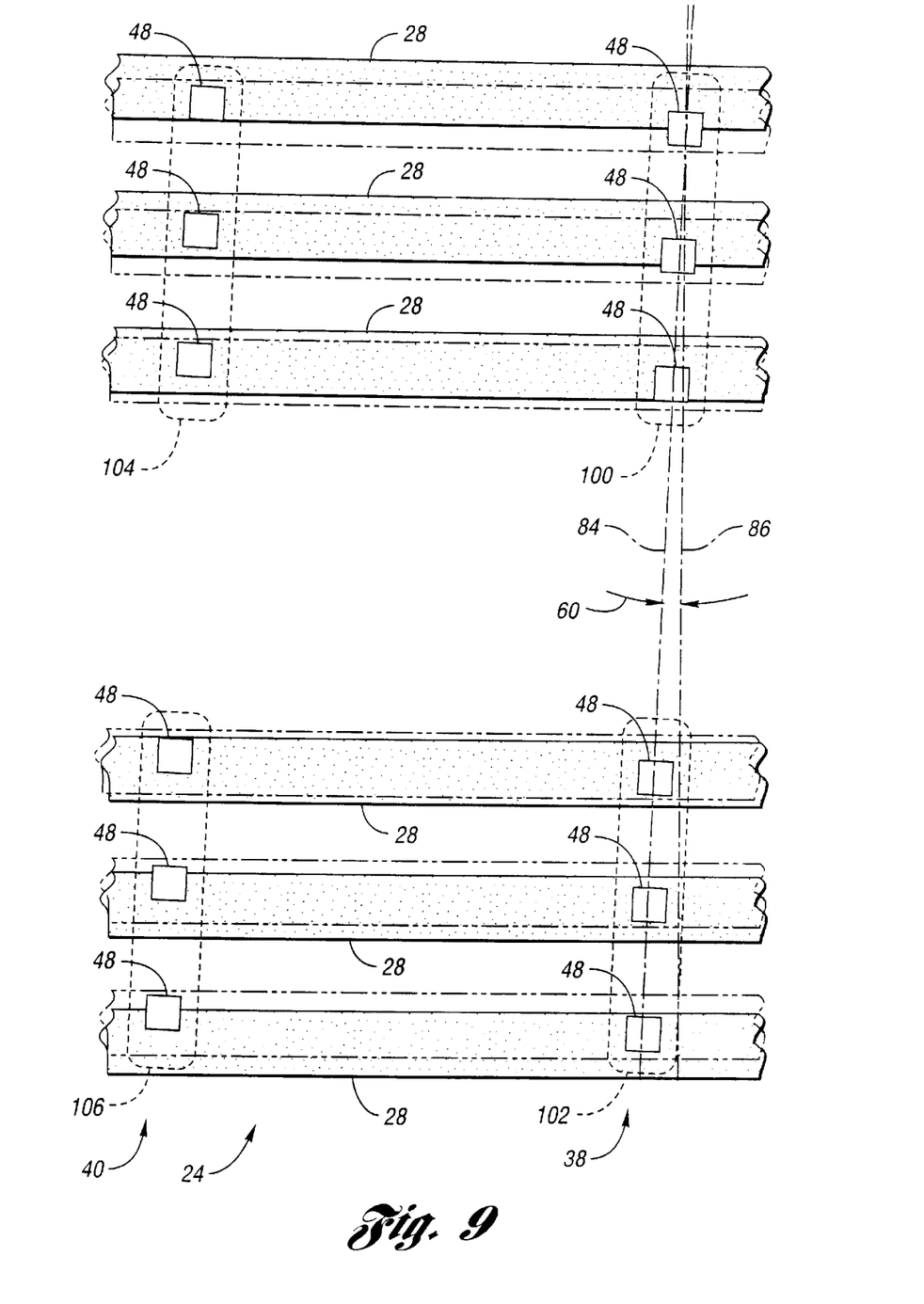
FIG. 9 is a schematic diagram of read element grouping for reading a tape with expansive longitudinal distortion according to an embodiment of the present invention.

Referring now to FIGS. 7–9, data read element grouping for reading multiple data tracks is shown. Typically, a plurality of data tracks 28 are simultaneously read from tape 24 by a plurality of data read elements 48. In FIG. 7, a schematic diagram of data read element grouping for reading a tape with no transverse distortion according to an embodiment of the present invention is shown. Data read elements 48 in first module 38 are grouped into either first module first group 100 or second module second group 102. Each data read element 48 on second module 40 is grouped into second module first group 104 if the data read element 48 corresponds with a data read element 48 on first module 38 in first module first group 100. Likewise, each data read element 48 on second module 40 is grouped into second module second group 106 if the data read element 48 corresponds with a read element 48 on first module 38 in first module second group 102. In the absence of excessive transverse distortion, data tracks 28 may be read by all data read elements 48 in first module 38 or all data read elements 48 in second module 40.

Referring now FIG. 8, a schematic diagram of read element grouping for reading a tape with compressive transverse distortion according to an embodiment of the present invention is shown. Tape 24 is shown with compressive transverse distortion relative to FIG. 7. This narrows each data track 28 and decreases the spacing between data tracks 28. Due to azimuth angle 60, data read elements 48 in first module second group 102 are transversely offset from data read elements 48 in second module second group 106. This transverse offset may be advantageously used to compensate for the compressive transverse distortion. For example, if data read elements 48 in first module first group 100 are used to read upper data tracks 28, data read elements 48 in second module second group 106 may be used to read lower data tracks 28.

Referring now to FIG. 9, a schematic diagram of data read element grouping for reading a tape with expansive transverse distortion according to an embodiment of the present invention is shown. Tape 24 is now illustrated with expansive transverse distortion relative to FIG. 7. Thus, each data track 28 is wider and the spacing between data tracks 28 is increased. The transverse offset between data read elements 48 in first module second group 102 and corresponding data read elements 48 in second module second group 106 may again be exploited to compensate for transverse distortion. For example, if data read elements 48 in second module first group 104 are used to read upper data tracks 28, data read elements 48 in first module second group 102 may be selected to read lower data tracks 28.

Skew or tilt between tape head 22 and tape 24 may result in data written onto different data tracks 28 at the same time being read by data read elements 48 at different times. A skew buffer is typically employed to buffer read data for a short time period so that the data read from different data tracks 28 may be reassembled for simultaneous delivery in the correct order. The use of two groups 100,102,104,106 from different modules 38,40 may necessitate the use of a larger skew buffer.

As has been described, the present invention is useful with a generation of tape systems 20 for more effective reading of distorted media. The present invention may also be used by tape system 20 of one generation in reading tapes 24 recorded by an earlier generation tape system 20. newer generation tape system 20 may access narrower data tracks 28 with narrower data read elements 48. Thus, transverse distortion will create a greater impact on reading tape 24. For example, the current generation tape system 20 may fit two data tracks 28 within the transverse distance across tape 24 occupied by a single data track 28 of a previous generation. Further, the previous generation may have looser tolerances and greater variation in data track 28 edges than those designed for the current generation. Any attempt at down-level reading of previous generation tape 24 by current generation system 20 would be further compounded by transverse distortion.

While embodiments of the invention have been illustrated and described, it is not intended that these embodiments illustrate and describe all possible forms of the invention. The words of the specification are words of description rather than limitation, and it is understood that various changes may be made without departing from the spirit and scope of the invention.

What is claimed is:

1. A method for reading data recorded on a tape, the tape having transverse distortion, the data written on a data track, the data read by a tape head having an azimuth angle relative to the tape, the azimuth angle creating a transverse offset between a data read element on a first module and a corresponding data read element on a second module, the method comprising:

determining a measure of the transverse distortion based on reading a plurality of servo tracks recorded on the tape; and selecting either the first module read element or the second module read element for reading the data track based on the determined transverse distortion.

2. A method for reading data recorded on a tape data track as in claim 1, the tape head having a first module and a second module, wherein determining a measure of the azimuth angle comprises:

reading a servo track recorded on the tape with a first servo read element located on the first module;

reading the servo track with a second servo read element located on the second module; and determining the measure of the azimuth angle based on signals produced by reading with the first servo read element and the second servo read element.

3. A method for reading data recorded on a tape data track as in claim 1 wherein determining a measure of the transverse distortion comprises:

reading a first servo track recorded on the tape with a first servo read element located on a module;

reading a second servo track recorded on the tape with a second servo read element located on the module; and determining the measure of the transverse distortion based on signals produced by reading with the first servo read element and the second servo read element.

4. A method for reading data recorded on a tape data track as in claim 1 wherein determining a measure of the azimuth angle comprises:

reading at least one servo track recorded on the tape with each of a plurality of pairs of servo read elements; and determining the measure of the azimuth angle based on averaging azimuth angle determined from each pair of servo read elements.

5. A method for reading data recorded on a tape data track as in claim 1 further comprising:

determining the azimuth angle based on reading at least one servo track recorded on the tape; and selecting either the first module read element or the second module read element for reading the data track based further on the determined azimuth angle.

6. A method for reading data recorded on a tape data track as in claim 1 wherein the measure of transverse distortion for a length of the tape is determined before data is read from the length of tape.

7. A method for reading data recorded on a tape data track as in claim 1 further comprising precharacterizing data read signal quality and basing selecting either the first module read element or the second module read element on a measure of the data read signal quality.

8. A method for reading data recorded on a tape data track as in claim 1 further comprising adjusting the azimuth angle to change the transverse offset between the first module read element and the second module read element.

9. A system for reading information recorded on tape having at least one servo track and at least one data track, the system comprising:

a tape head comprising at least a first module and a second module, each of the first module and the second module having at least one read element for reading data written on the tape, the tape head having an azimuth angle relative to the tape, the azimuth angle creating a transverse offset between each read element on the first module and a corresponding read element on the second module;

a plurality of servo read elements, each servo read element located on one of the modules, each servo read element generating a servo read signal based on reading a servo track recorded on the tape; and control logic in communication with the servo read elements, the control logic determining tape position error based on the servo read signals and determining whether to read the data track with the first module read element or the second module corresponding read element based on the determined tape position error.

10. A system for reading information recorded on tape as in claim 9 wherein the position error indicates a transverse distortion between at least two servo tracks.

11. A system for reading information recorded on tape as in claim 9 wherein the plurality of servo read elements comprises a plurality of pairs of servo read elements, the control logic determining tape position error based on averaging the tape position error calculated from each pair of servo read elements.

12. A system for reading information recorded on tape as in claim 9 wherein the control logic is further determining the azimuth angle from at least two servo read signals.

13. A system for reading information recorded on tape as in claim 9 wherein the control logic determines tape position error along a length of tape before any data is read from the length of tape.

14. A system for reading information recorded on tape as in claim 9 further comprising a memory holding at least one parameter describing data read signal quality along a length of tape, the control logic determining the first module read element or the second module read element based on the signal quality parameter.

15. A system for reading information recorded on tape as in claim 9 further comprising an azimuth adjustment drive for changing the azimuth angle, the control logic adjusting the azimuth angle to change the transverse offset between the first module read element and the second module read element.

16. A method for reading data recorded on tape, the data recorded as a plurality of data tracks, the data read by a tape head having at least a first module and a second module, the first module having a plurality of read elements and the second module having a plurality of corresponding read elements, the tape head forming an azimuth angle with the tape, the azimuth angle creating a transverse offset between a data read element on the first module and a corresponding data read element on the second module, the method comprising:

grouping each data read element on the first module into a first group and a second group;

grouping each data read element on the second module into the first group if the data read element corresponds with a first module first group data read element and grouping each data read element on the second module into the second group if the data read element corresponds with a first module second group data read element;

determining a measure of transverse distortion on the tape;

reading at least one data track with a first module first group data read element; and reading at least one additional data track, the additional data track read with either a data read element from the first module second group or a data read element from the second module second group based on the determined measure of transverse distortion.

17. A method for reading data recorded on tape as in claim 16 further comprising:

reading a servo track recorded on the tape with a first servo read element on the first module;

reading the servo track with a second servo read element on the second module; and determining the measure of azimuth angle based on signals generated by the first servo read element and by the second servo read element.

18. A method for reading data recorded on tape as in claim 16 further comprising:

reading a first servo track recorded on the tape with a first servo read element on a particular module;

reading a second servo track recorded on the tape with a second servo read element on the particular module; and determining the measure of transverse distortion based on the first servo track reading and the second servo track reading.

19. A method for reading data recorded on tape as in claim 16 further comprising:

reading at least one servo track recorded on the tape with each a servo read element in a plurality of pairs of servo read elements;

determining the measure of azimuth angle based on averaging azimuth angle determined from each pair of servo read elements.

20. A method for reading data recorded on tape as in claim 16 further comprising determining the azimuth angle by reading at least one servo track recorded on the tape, each servo track read by a plurality of servo read elements.

21. A method for reading data recorded on tape as in claim 16 wherein the measure of transverse distortion for a length of the tape is determined before data is read from the length of tape.

22. A method for reading data recorded on tape as in claim 16 further comprising precharacterizing data read signal quality and basing selecting either a data read element from the first module second group or the corresponding data read element from the second module second group on the precharacterized data read signal quality.

23. A method for reading data recorded on tape as in claim 16 further comprising adjusting the azimuth angle to change the transverse offset between each first module read element and the corresponding second module read element.

24. A method for reading data recorded on a tape, the tape having transverse distortion, the data written on a data track, the data read by a tape head having an azimuth angle relative to the tape, the azimuth angle creating a transverse offset between a first data read element a second data read element longitudinally spaced from the first data read element, the method comprising:

determining a measure of the transverse distortion based on reading a plurality of servo tracks recorded on the tape; and selecting either the first data read element or the second data read element for reading the data track based on the determined transverse distortion.

* * * * *